United States Patent [19]

Lambert

[11] 4,246,891

[45] Jan. 27, 1981

[54] LOW REFLECTION LOSS CUSP LIKE REFLECTOR FOR SOLAR ENERGY COLLECTOR

[75] Inventor: Raymond H. Lambert, Eagleville, Pa.

[73] Assignee: General Electric Company, Philadelphia, Pa.

[21] Appl. No.: 74,717

[22] Filed: Sep. 12, 1979

[51] Int. Cl.³ .......................... F24J 3/02; G02B 5/10; F28F 9/04
[52] U.S. Cl. .................................... 126/438; 126/443; 165/178; 350/296
[58] Field of Search .............. 126/438, 439, 442, 443, 126/446, 449, 450, 417, 441; 165/177, 178; 350/293, 296, 288

[56] References Cited

U.S. PATENT DOCUMENTS

| | | | |
|---|---|---|---|
| 3,893,754 | 7/1975 | McInally | 350/288 |
| 3,923,381 | 12/1975 | Winston | 126/439 |
| 3,957,031 | 5/1976 | Winston | 350/293 |
| 4,011,855 | 3/1977 | Eshelman | 126/439 |
| 4,059,093 | 11/1977 | Knowles et al. | 126/439 |
| 4,130,107 | 12/1978 | Rabl et al. | 350/293 |
| 4,134,392 | 1/1979 | Livermore | 126/439 |
| 4,142,510 | 3/1979 | Hare et al. | 126/438 |
| 4,148,299 | 4/1979 | Sherman | 126/439 |
| 4,191,164 | 3/1980 | Kelly | 126/439 |
| 4,198,955 | 4/1980 | Porbeck | 126/438 |

*Primary Examiner*—James C. Yeung
*Assistant Examiner*—Daniel O'Connor
*Attorney, Agent, or Firm*—Allen E. Amgott; Raymond H. Quist

[57] ABSTRACT

There is disclosed the manner in which a reflector for a solar energy collector is designed. The absorber is a right circular cylinder and is contained in an evacuated glass shroud. The glass shroud prevents the use of the reflector design technique of the prior art, and instead calculations are performed as if an absorber having a smaller diameter were to be used.

6 Claims, 1 Drawing Figure

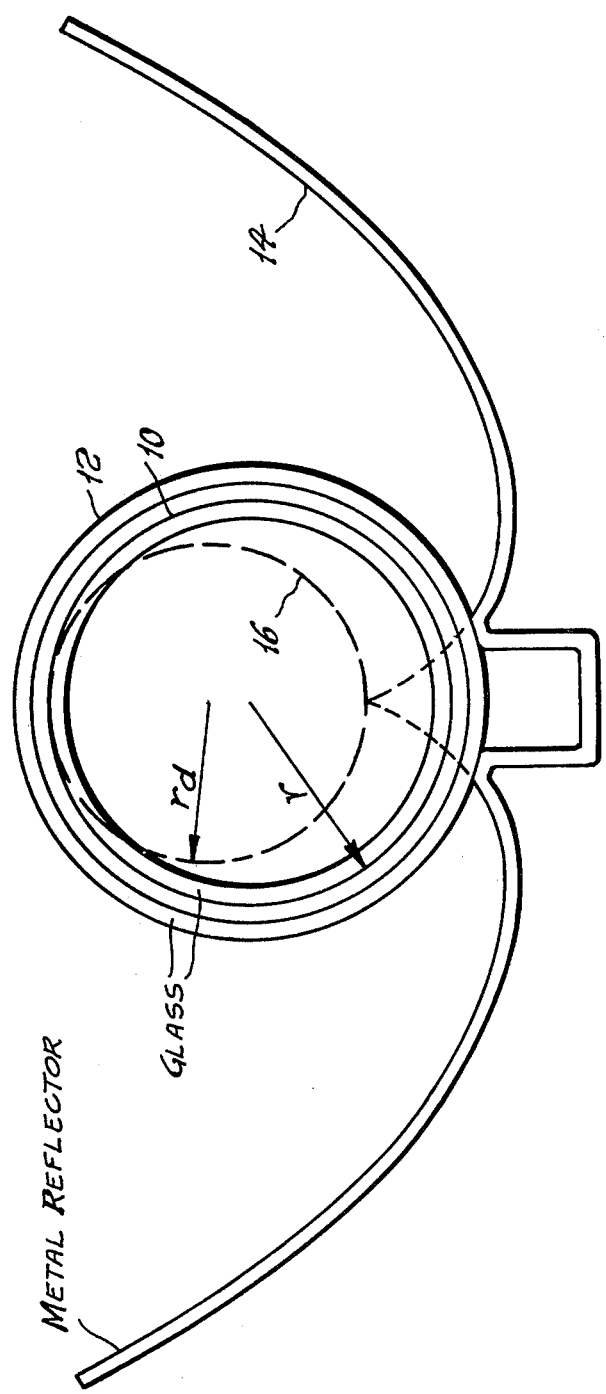

LOW REFLECTION LOSS CUSP LIKE REFLECTOR FOR SOLAR ENERGY COLLECTOR

BACKGROUND OF THE INVENTION

This invention relates generally to tubular solar collectors and more particularly to a reflector for such a collector.

In the July 1976 issue of Applied Optics (Vol. 15, No. 7) Ari Rabl described a reflector which he suggested would give maximal concentration for a cylindrical absorber. When the absorber (which normally has a coating on its surface having high absorptivity and low emissivity) is contained in a glass cylinder or shroud, but spaced from the shroud, the equations Rabl uses to define the shape of the reflector cannot be directly applied for reasons which will be given later. These equations do serve as a starting point, however, and are given below using somewhat different notation.

The first equation is an involute of the circular cylindrical absorber surface and begins at the negative y axis (which is denoted as the angle $\theta=0$). In accordance with convention, when considering solar collectors which are symmetrical about a center line, one half is dealt with, normally the right half. The involute continues going counterclockwise to the point where $\theta = \pi/2 + \theta_a$. As is well known in the art, a concentrating reflector of the type here being considered has a field of view, and $\theta_a$ is the one half field of view. The field of view is that angle, measured from the vertical over which the reflector will reflect all solar energy rays passing between the opposite edges of the reflector (its aperture) onto the absorber. Thus, on a clear day, when the sun first rises above the horizon and continuing up to the time when the sun comes within the field of view, the reflector will not reflect all the solar energy rays passing through the aperture onto the absorber.

Rabl's disclosure illustrates but does not describe how "p" in the equations is used. For each $\theta$, a radius is drawn from the center of the absorber to the surface at the angle $\theta$, and then a line is drawn perpendicular to the radius a distance p down. The end points of these lines define the reflector surface.

The first equation is:

$$p = r\theta.$$

The second equation is:

$$p = r\left[\frac{\theta + \theta_a + \pi/2 - \cos(\theta - \theta_a)}{1 + \sin(\theta + \theta_a)}\right]$$

In these equations:
p = the perpendicular distance from the reflector to the absorber,
r = the radius of the absorber,
$\theta$ = the angle measured counterclockwise from the negative y axis, and
$\theta_a$ = the $\frac{1}{2}$ field of view.

The second equation begins where the first one ends, at $\theta = \pi/2 + \theta_a$. Rabl gives an end point of $3\pi/2 - \theta_a$ for this equation, but the present invention makes no use of it because an earlier termination is used.

SUMMARY OF THE INVENTION

In the equation disclosed by Rabl, $r_d$ is substituted for r. Instead of the radius of the absorber, $r_d$ is used which is from 5% to 15% smaller than the physical absorber radius. This eliminates losses which occur because of the glass shroud when r is used. The shroud and absorber are also positioned down lower in the reflector, and the reflector walls are terminated at the point where more than one reflection will occur when the sun is perpendicular to the plane of the collector.

BRIEF DESCRIPTION OF THE DRAWING

The drawing is a front elevation or profile of a reflector with associated absorber.

DESCRIPTION OF THE PREFERRED EMBODIMENT

Referring to FIG. 1 absorber 10 is shown contained in glass shroud 12 and has reflector 14 reflecting solar radiation on to it. If reflector 14 continued as shown by the broken lines, and if circle 16 indicated by broken lines were the absorber, then reflector 14 would be constructed in accordance with the equations given above.

In accordance with the invention, $r_d$ a radius smaller than the radius r of the absorber is used in the equations. This radius was selected in the case of solar energy collector built in accordance with the invention by considering the absorber with its shroud when centered at the origin of $r_d$ in FIG. 1. In this position when vertical rays are drawn immediately adjacent to the shroud they should be reflected from the reflector surface at an angle sufficient to avoid total internal reflection within the shroud glass. These rays should strike the absorber at an angle of about 60 degrees or greater. Thus, by substituting in the equations different values for r a value can be selected for $r_d$ which gives the desired results.

Each reflector has an aperture, i.e. the distance between opposite edges. Depending upon the materials used in the absorber or in its selective coating there is normally some temperature which can be selected which should not be exceeded. This temperature is designated the stagnation temperature because it is the worst case temperature which occurs when the fluid used to carry heat from the absorber is not moving, i.e. it is stagnant, and it is a clear day at solar noon. As is well known, under stagnation conditions the absorber will reach an equilibrium condition where it will radiate heat at the same rate as it is absorbed. The temperature at which this occurs increases as the aoerture of the reflector increases. Therefore the aperture size is dependent upon the stagnation temperature limitation. Using the stagnation temperature, the emissivity and absorbtivity of the absorber, the area of the absorber and the maximum insolation, the aperture width is determined.

In the solar energy collector built, the stagnation temperature was 427° C. (800° F.).

Having arrived at an aperture suitable for the reflector, the radius to be used in designing the reflector is next selected. Using as the radius r in the Rabl equations, a plurality of radii from 5 to 15 percent smaller than the radius of the absorber to be used with the reflector, a number of reflector profiles are constructed. Ray traces are then performed to determine which profile will result in all rays striking the absorber at an angle (measured from a radius at the point of impact) of sixty degrees or greater at solar noon. This ray tracing should take into account the refraction caused by the glass shroud. The radius selected for the final profile should also be the least different from the radius of the absorber while still meeting the ray tracing requirement.

The absorber is moved vertically down until its top is just tangent to the circle 16 formed by the radius used to design the reflector ($r_d$ in the drawing).

It will be recognized that if the walls of the reflector are extended, more rays will be collected; however, beyond a certain point more than one reflection is necessary for a ray at solar noon to reach the absorber. Since each reflection results in the absorption by the reflector of some of the energy of the light ray, diminishing returns result from extending the reflector beyond the zone of one reflection.

I claim:

1. A reflector for a solar energy collector having a circular absorber contained in a glass shroud comprising:

a reflector profile having a first portion extending between $\theta=0$ and $\theta=\pi/2+\theta_a$ generated in accordance with:

$$p = r_d \theta$$

a second portion extending from $\theta=\pi/2+\theta_a$ generated in accordance with:

$$p = r_d \left[ \frac{\theta + \theta_a + (\pi/2) - \cos(\theta - \theta_a)}{1 + \sin(\theta - \theta_a)} \right]$$

where:

p = the perpendicular distance from the reflector to the tangent to the absorber, $r_d$ = a radius smaller than that of the absorber,
$\theta$ = the rotational position on the absorber measured from the negative y axis, and
$\theta_a$ = the design ½ field of view.

2. A reflector for a solar energy collector having a circular absorber contained in a glass shroud in accordance with claim 1 wherein:

part of said first portion of said reflector profile is omitted to accommodate said glass shroud.

3. A reflector for a solar energy collector having a circular absorber contained in a glass shroud in accordance with claim 2 wherein:

said second portion of said reflector profile terminates at the point where a ray at solar noon will begin to have more than one reflection before reaching said absorber.

4. A reflector for a solar energy collector having acircular absorber contained in a glass shroud in accordance with claim 2 wherein:

said absorber has its center positioned below the center for $r_d$.

5. A reflector for a solar energy collector having a circular absorber contained in a glass shroud in accordance wth claim 1 wherein:

part of said first portion of said reflector profile is omitted to accommodate said glass shroud.

$r_d$ is from 5% to 15% smaller than the radius of said absorber.

6. A reflector for a solar energy collector having a circular absorber contained in a glass shroud in accordance with claim 4 wherein:

the top of said absorber is tangent to a circle drawn at $r_d$.